March 24, 1942.   W. P. MASON   2,277,245
PIEZOELECTRIC CRYSTAL APPARATUS
Filed Nov. 25, 1936   6 Sheets-Sheet 1

INVENTOR
W. P. MASON
BY W. J. O'Neill
ATTORNEY

March 24, 1942.  W. P. MASON  2,277,245
PIEZOELECTRIC CRYSTAL APPARATUS
Filed Nov. 25, 1936  6 Sheets-Sheet 2

INVENTOR
W. P. MASON
BY
W. J. O'Neill
ATTORNEY

March 24, 1942.   W. P. MASON   2,277,245
PIEZOELECTRIC CRYSTAL APPARATUS
Filed Nov. 25, 1936   6 Sheets-Sheet 3

INVENTOR
W. P. MASON
BY
W. J. O'Neill
ATTORNEY

March 24, 1942.  W. P. MASON  2,277,245
PIEZOELECTRIC CRYSTAL APPARATUS
Filed Nov. 25, 1936  6 Sheets-Sheet 4
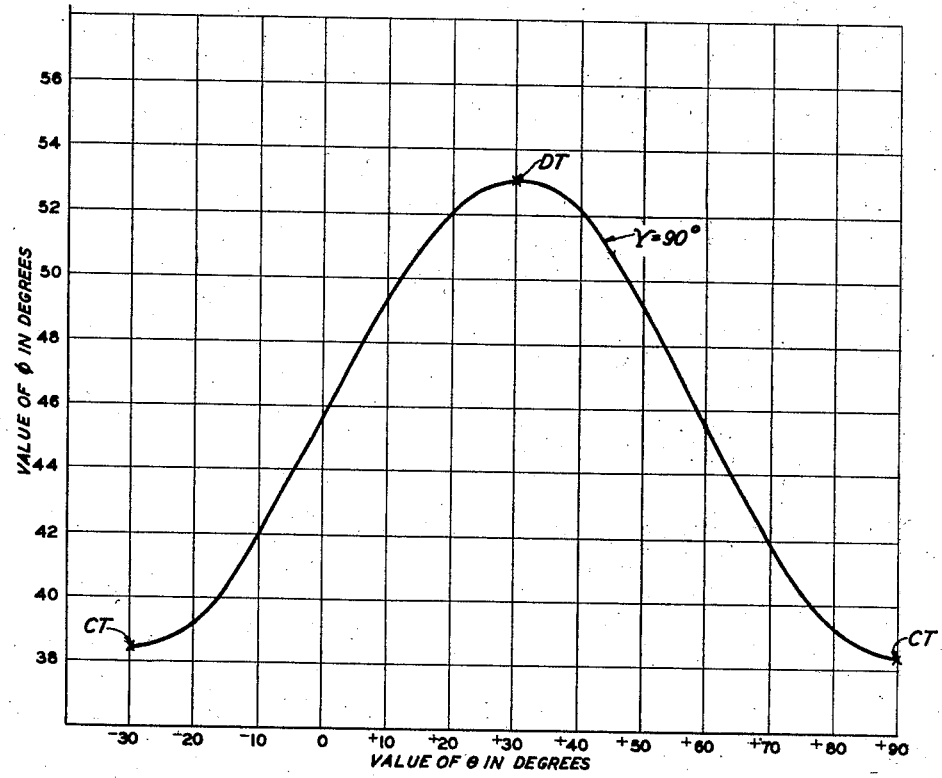
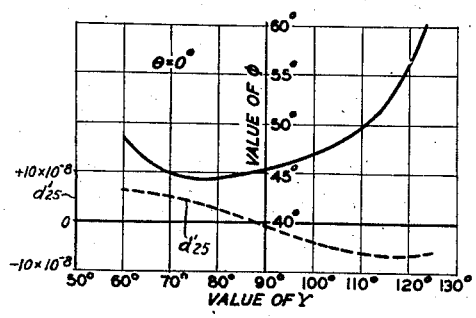
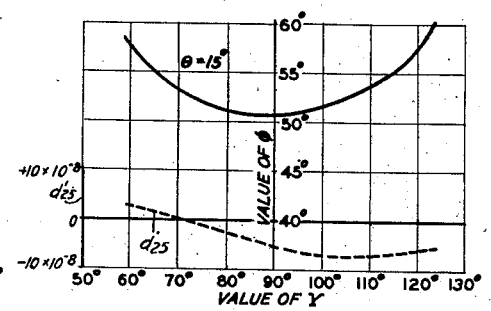
INVENTOR
W. P. MASON
BY
W. J. O'Neill
ATTORNEY

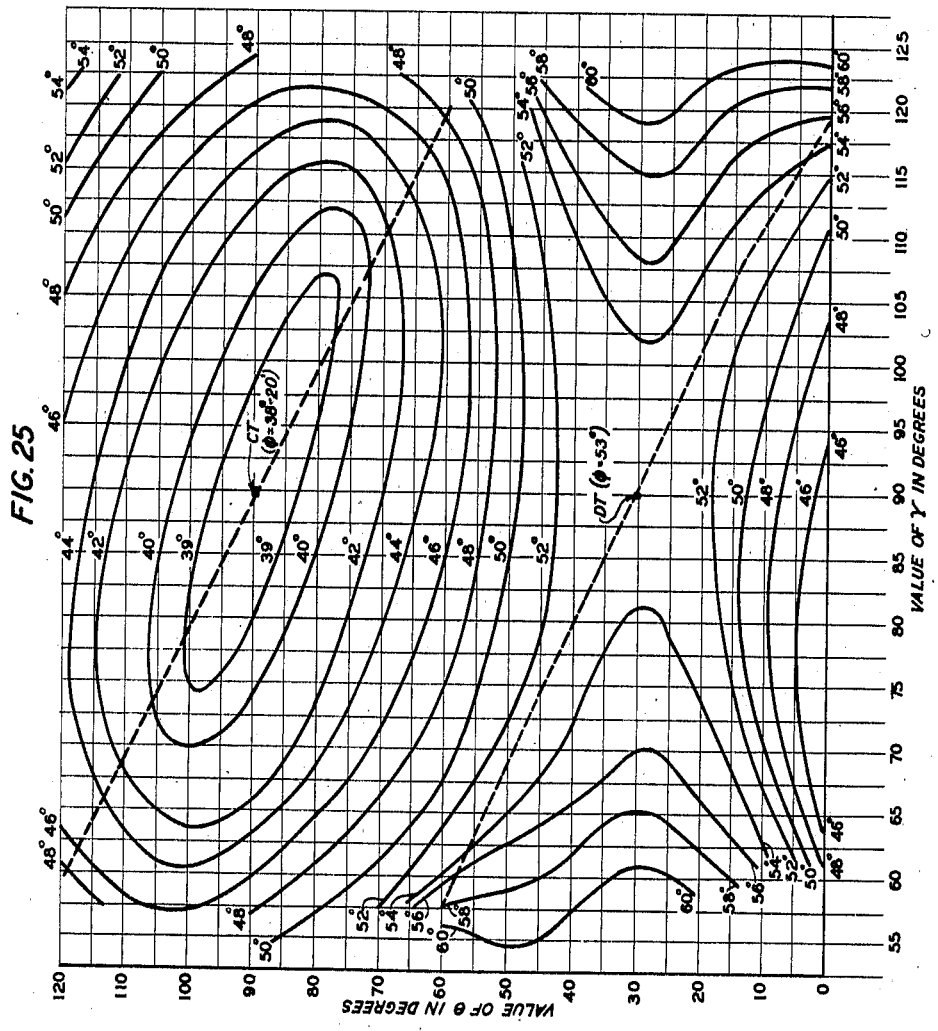

Patented Mar. 24, 1942

2,277,245

UNITED STATES PATENT OFFICE 2,277,245

PIEZOELECTRIC CRYSTAL APPARATUS

Warren P. Mason, West Orange, N. J., assignor to Bell Telephone Laboratories, Incorporated, New York, N. Y., a corporation of New York Application November 25, 1936, Serial No. 112,685

17 Claims. (Cl. 171—327)

This invention relates to piezoelectric apparatus and particularly to the angular orientation of the faces and of the physical or geometrical axes of piezoelectric crystal bodies with respect to the crystallographic axes thereof to control the effects of temperature upon the vibration frequency thereof and to provide elements such as piezoelectric quartz crystals suitable for use as frequency-determining elements in oscillation generating systems or in electric wave filter systems or other networks, for example.

One of the objects of this invention is to control the effect of temperature upon the vibration frequency of a piezoelectric body.

Another object of this invention is to provide piezoelectric crystals having such multiple angle orientations with respect to the crystallographic axes thereof as to produce a substantially zero or other desired predetermined temperature coefficient of vibration frequency.

Another object of this invention is to permit temperature regulating apparatus for piezoelectric bodies to be simplified or eliminated.

Another object of this invention is to provide piezoelectric crystals having high piezoelectric driving constants and large values of piezoelectric activity.

It is well known that a piezoelectric quartz crystal may produce a vibration of fairly constant frequency and yet there may exist various factors affecting the constancy of its vibration frequency. Among them, the variation of the operating temperature of the crystal is an important factor. It may be desired therefore to obtain a crystal having its vibration frequency substantially independent of its temperature variation.

As the temperature of a piezoelectric quartz body is changed, the dimensions, the density and the elastic constants thereof which relate mechanical stresses to corresponding mechanical strains, also tend to change, and may bring about a corresponding change in the vibrating frequency thereof.

In accordance with this invention, the temperature coefficient of frequency of a piezoelectric body may be made substantially zero or other desired predetermined value by so cutting the body from the natural crystal that the relative position of its surfaces and axes with respect to the crystallographic axes thereof results in a compensating relationship between the several components of the temperature coefficients of density, dimension, and elastic constant which together make up the resultant temperature coefficient of frequency of the body. In the case of quartz this may involve a rotation or orientation of the body such that the surfaces or axes thereof are inclined to two or more of the crystallographic axes of the quartz.

In accordance with this invention, piezoelectric crystals such as quartz crystal elements may be oriented with respect to the electric, mechanical and optic crystallographic axes thereof in such manner as to obtain all the angles of the desired orientations giving zero or the lowest value of temperature coefficient of frequency for any mode of vibration such as, for example, shear wave modes of vibration which are particularly illustrated herein. Thus, the temperature coefficients of frequency for any angular orientation for any mode of vibration may be obtained and whole surfaces of low temperature coefficient quartz crystals may be obtained which may have other advantages such as large values of electromechanical coupling or piezoelectric activity, and small mechanical coupling with any other mode or with any undesired modes of vibration therein.

In a particular embodiment, the crystal may be quartz and may have such selected double or triple angular orientations of its axes or surfaces with respect to the crystallographic axes thereof as to constitute the major effective means for producing zero temperature coefficient of frequency to thereby render the frequency substantially independent of temperature change throughout a given temperature range. The multiple orientation angles may be such as to produce or obtain zero temperature coefficient of frequency for the crystal when vibrated in a shear mode of motion at a relatively high frequency determined by the thickness or smallest dimension of the crystal element, or when vibrated in a shear mode of motion at a frequency determined by some other dimension or dimensions thereof, as for example, by one or more of the major surface dimensions or periphery thereof to obtain a relatively low frequency vibration.

For a clearer understanding of the nature of this invention and the additional features and objects thereof, reference is made to the following description and the accompanying drawings, in which like reference characters represent like or similar parts, and in which Fig. 1 is a perspective view of a rectangular parallelepiped quartz plate having such selected multiple orientation angles as to produce a desired temperature coefficient of frequency;

Figure 3:
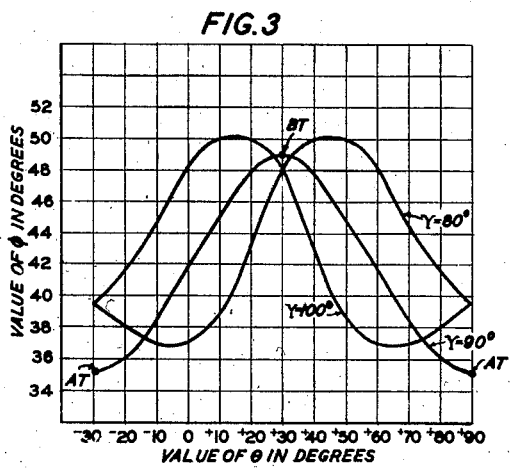
Fig. 3 is a graph illustrating particular sets of selected orientation angles for the quartz crystal plate 1 shown in Fig. 1 that may be utilized to produce substantially zero temperature coefficient of frequency when vibrating in the high frequency or XY' shear vibration mode of motion at a frequency determined by the thin dimension $t$ of the plate 1.

Figs. 4 to 15 are additional graphs illustrating particular sets of orientation angles for every ten degrees of angle $\theta$ and the corresponding values of piezoelectric activity moduli $d'_{26}$ for the quartz crystal plate 1 having substantially zero temperature coefficient of frequency when vibrating in the same relatively high frequency XY' shear mode of motion at a frequency determined by the thin dimention $t$ of the plate 1 as illustrated in the curves of Fig. 3;

Fig. 16 is a graph similar to Fig. 3 illustrating particular zero temperature coefficient of frequency orientation angles for vibrations in a shear mode of motion but at a relatively low frequency determined by a large dimension $l$ of the plate 1;

Figs. 17 to 24 are graphs similar to those of Figs. 4 to 15 but illustrating the orientation angles and corresponding values of the piezoelectric activity moduli $d'_{25}$ for vibrations in the low frequency face or Z'x shear mode of motion at a relatively low frequency determined by the large dimension $l$ of the quartz plate 1.

Fig. 25 is a graph illustrating additional sets of orientation angles for the quartz plate 1 to produce zero temperature coefficient of frequency and also maximum values of piezoelectric activity in the low frequency Z'x shear mode of vibration.

Quartz crystals may occur in two forms, namely, right-hand and left-hand. A crystal is designated as right-hand if it rotates the plane of polarization of plane polarized light traveling along the optic or Z axis in a clockwise direction when facing in the direction of propagation of the light, and is designated as left-hand if it rotates the plane of polarization in the counter-clockwise direction. If a compressional stress be applied to the ends of the electric axis of a quartz crystal body and not removed, a charge will be developed which is positive at the positive end of the electric axis and negative at the negative end of the electric axis for either right-hand or left-hand crystals. The magnitude and sign of the charge may be measured with a vacuum tube electrometer, for example. It is necessary to distinguish between a left-handed and right-handed crystal in specifying the direction for measuring the angles $\phi$, $\theta$, $\psi$ and $\gamma$. As may be seen from Fig. 1, the angle $\phi$ is always positive since it measures the angle between Z' and Z. Similarly, the angles $\psi$ and $\gamma$ are always positive. The angle $\theta$, however, can be either positive or negative and the sense of it differs for a right-handed or a left-handed crystal.

In order to agree with standard usage, one may define a positive angle $\theta$ as a counter-clockwise rotation of the ZZ' plane around the Z axis for a right-handed crystal measured from the positive X axis (determined by a compression). For a left-handed quartz crystal, a positive angle $\theta$ is measured in a clockwise direction.

It will be noted that this specification follows the standard terminology as applied to quartz which employs orthogonal X, Y and Z axes to designate the orthogonal electric, mechanical and optic axes respectively of the piezoelectric quartz crystal material and which employs X', Y' and Z' to designate the directions of axes or surfaces of a piezoelectric body angularly oriented with respect to the orthogonal X, Y and Z crystallographic axes thereof. Where the orientation is obtained by multiple rotations as illustrated in Fig. 1, for example, the orientation angles $\phi$, $\theta$, $\gamma$ designate the effective angular position of the crystal in degrees as measured from the optic crystallographic axis Z and from the electric crystallographic axis X as shown in Fig. 1 and as described hereinafter.

Figure 1:
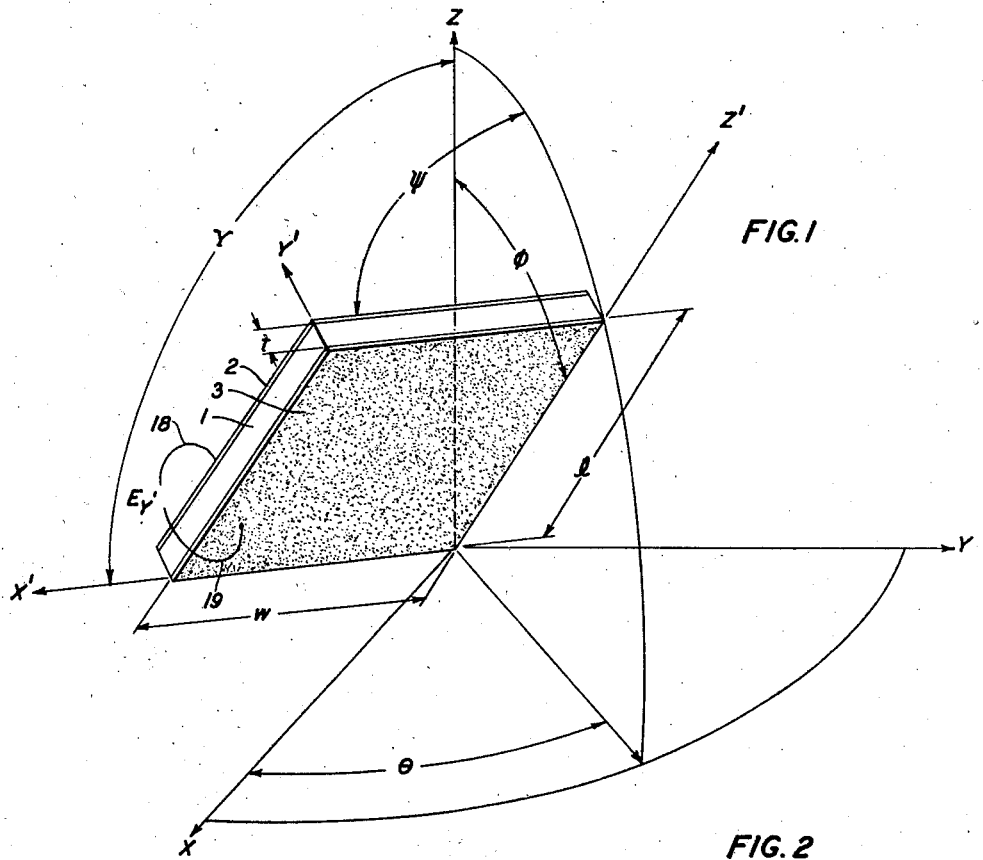

Referring to the drawings, Fig. 1 illustrates a perspective view of a piezoelectric quartz crystal element or plate 1 of substantially rectangular parallelepiped shape and having a length $l$, a width $w$, and a thickness or small dimention $t$. The directions of the axes and the surfaces of the piezoelectric body 1 with respect to the orthogonal crystallographic axes X, Y and Z thereof are designated by the orthogonal X', Y' and Z' axes, respectively. The Y' axis is normal or perpendicular to the major plane and to the two major or electrode faces of the plate 1 and extends in the direction of the thickness dimension $t$.

The crystal plate 1, as illustrated in Fig. 1, has two parallel major faces separated by a uniform thickness distance $t$ which may be made relatively small compared to the dimensions $l$ and $w$ of the two large major faces in order to prevent mechanical coupling with undesired modes of vibration therein. The vibration of the quartz plate 1 may be in the XY' shear mode of motion at a relatively high frequency determined by the thickness dimension $t$ and depending on the elastic constant $c_{66'}$, or may be at a relatively low frequency determined by the large dimensions $l$ and $w$ and depending in the elastic constant $S'_{55}$. When the crystal plate 1 is driven at a frequency determined by the major surface dimensions $l$ and $w$ thereof, a relatively low frequency vibration may be obtained in the range from 30 to 500 or more kilocycles per second, for example. And when the crystal plate 1 is driven at a frequency determined by the thinnest dimension $t$, a relatively high frequency vibration may be obtained in the range above 1000 kilocycles per second, for example. It will be understood that suitable electrodes such as the conductive electrodes 2 and 3, suitable mountings and suitable circuits may be associated with the crystal 1 to excite and drive the crystal at a selected characteristic frequency thereof.

The quartz plate 1 may be cut from the mother crystal at selected angles $\theta$, $\phi$ and $\gamma$ or $\psi$ with respect to the crystallographic axes to obtain a desired temperature coefficient of frequency as hereinafter disclosed. The electric field E may be applied by the electrodes 2 and 3 along the Y' or thickness $t$ direction of the plate 1 and, for high frequencies, an XY' shear mode of vibration may be utilized. This XY' shear high frequency vibration is not adversely affected when the plate 1 is rigidly clamped either around the periphery margins of the major surfaces if the plate is circular, or at the four corners if the plate 1 is square or rectangular as illustrated. A mechanically rigid holder arrangement may therefore be obtained which is particularly suitable for mobile radio applications. Reference is made to U. S. Patent 1,883,111 to G. M. Thurston, October 18, 1932, and to U. S. Patent 2,218,200 granted October 15, 1940, on application Serial No. 728,640, filed June 2, 1934, by F. R. Lack, G. W. Willard and I. E. Fair for examples of suitable electrode and clamping arrangements for this high frequency XY' shear mode of vibration. It will be noted that the quartz plate 1 may be clamped at its periphery margins to discriminate in favor of the high frequency shear vibrations as against the flexural vibrations, as disclosed for example in Figs. 8 and 9 of U. S. Patent 2,173,589, granted September 19, 1939, on application Serial No. 702,334, filed December 14, 1933, by W. P. Mason the present applicant and R. A. Sykes.

Where the crystal plate 1 has well defined nodal regions as in the case of the low frequency shear vibrations referred to, the plate 1 may be nodally clamped by mountings as illustrated, for example, in U. S. Patent 2,032,865, granted March 3, 1936, to C. A. Bieling, in Fig. 10 of U. S. Patent 2,173,589, granted September 19, 1939, on application Serial No. 702,334 referred to, and in U. S. Patent No. 2,268,365 dated December 30, 1941, and granted on application Serial No. 77,325, filed May 1, 1936, by G. W. Willard. In the case of such nodal clamping, the electrodes 2 and 3 may conveniently consist of a thin coating of metal such as aluminum formed integral with or otherwise closely associated with the two opposite major faces of the crystal 1. The electrodes 2 and 3 may be electrically connected in circuit with any suitable system such as, for example, an oscillation generating system or an electric wave filter system to excite the crystal plate 1 at a vibration frequency determined by the thickness dimension $t$ or by the dimension $l$ or dimensions $l$ and $w$. It will be understood that the frequency may be any desired value dependent upon the frequency-controlling dimension or dimensions selected.

Figure 2:
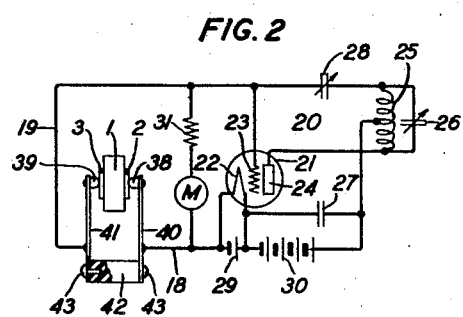
Fig. 2 is an illustrative diagram of a particular circuit arrangement that may be utilized to excite the crystal plate shown in Fig. 1.

Conductive connectors 18 and 19 may be utilized to electrically connect the crystal 1 and its electrodes 2 and 3 in circuit with a vacuum tube oscillation generator 20 as illustrated in Fig. 2, for example, to control the frequency of oscillations thereof. The particular oscillator 20 includes a vacuum tube 21 having a cathode 22, a grid 23, and a plate electrode 24. The output circuit of the oscillator 20 may include a tuning coil 25 connected in parallel circuit relation with a variable condenser 26. A by-pass condenser 27 may connect the mid-point of the tuning coil 25 with the cathode 22. A feed-back condenser 28 may feed back radio frequency oscillations to the grid electrode 23. Suitable batteries 29 and 30 as illustrated may energize in a known manner the cathode 22 and plate electrode 24, respectively. A grid-leak resistance 31 and a milliammeter M may be connected between the grid 23 and the cathode 22. It will be understood that the crystal 1 may be utilized to control the frequency of oscillations of any suitable oscillator, the particular oscillator 20 being shown in Fig. 2 as an illustrative example only.

Similarly, the conductive connectors 18 and 19 may be utilized to operatively connect the crystal 1 in circuit with an electric wave filter system to form a selective element thereof as illustrated, for example, in application Serial No. 65,022, filed February 21, 1936, by W. P. Mason now U. S. Patent 2,185,599, dated January 2, 1940, or in applicant's publication entitled "Electrical wave filters employing quartz crystals as elements," Bell System Technical Journal, page 433, July 1934.

As illustrated in Fig. 2, the crystal 1 when excited in the low frequency shear mode of motion may conveniently have integral plated electrodes 2 and 3 and may be rigidly nodally clamped at the center of the major surfaces thereof by means of a pair of coaxial metallic clamping projections 38 and 39 supported and resiliently controlled by metallic springs 40 and 41 which may be secured to an insulating block 42 by screws 43. Electrical connections with the crystal 1 may be established through the crystal electrodes 2 and 3, the clamping projections 38 and 39, the springs 40 and 41, and the conductor wires 18 and 19.

While a particular arrangement for mounting and establishing electrical connections with the crystal 1 has been illustrated in Fig. 2, it will be understood that any suitable arrangement may be utilized for clamping or otherwise mounting the crystal 1 and that any suitable electrodes and circuit arrangement may be utilized for exciting the crystal 1 in the mode of vibration described.

Referring to Fig. 1, when the crystal plate 1 is vibrating in shear mode along, and at a frequency determined by, its thickness or smallest dimension $t$, which may be a high frequency vibration, the positions of the surfaces and the axes X', Y' and Z' thereof at which the crystal 1 has a zero or other desired predetermined temperature coefficient of frequency may be substantially located by calculations as follows:

The frequency of transverse vibrations in a thin crystal plate 1 may be given by the expression:

$$f = \frac{1}{2t}\sqrt{\frac{c_{66}}{\rho}} \quad (1)$$

where, $t$ is the thickness dimension of the quartz crystal plate 1 in cm. in the direction of propagation, $c_{66}$ is the XY' shear elastic constant for quartz, relating the shearing stress in the XY' plane with the resulting shearing strain in the same plane, and $\rho$ is the density = $\dfrac{\text{mass}}{\text{volume}}$ of quartz = 2.65 gms. per cm.$^3$ If all of these quantities change with temperature, then $$T_f = -T_t + \frac{T_{c_{66}}}{2} - \frac{T_\rho}{2} \quad (2)$$

where, $T_f$ is the temperature coefficient of frequency of the crystal plate, $T_t$, the temperature coefficient of the thickness dimension $t$, $T_{c_{66}}$, the temperature coefficient of the shearing modulus, and $T_\rho$, the temperature coefficient of the density of quartz.

To find the orientation angles of the quartz crystal 1 for which Equation 2 vanishes so that the resultant temperature coefficient $T_t$ is zero, the component temperature coefficients thereof may be treated as follows:

The temperature coefficient of density of the quartz is a constant independent of orientation and is equal to:

$$T_\rho = -38.6 \times 10^{-6} \text{ per degree centigrade} \quad (3)$$

The temperature coefficient of thickness $T_t$ is 9 parts per million for expansion along the optic axis Z, 14.8 parts per million for expansion along a direction perpendicular to the optic axis Z, and along any other direction is:

$$T_t = 14.8 - 5.8 \cos^2 \delta \quad (4)$$

where $\delta$ is the angle the radius vector makes with the optic axis Z.

To calculate how the temperature coefficient of the shearing modulus $T_{c_{66}}$ varies with any orientation of the crystal 1, the orientation may be specified as illustrated in Fig. 1 where the width dimension $w$ of the crystal 1 lies along or in the direction of the X' axis, the length dimension $l$ and the shearing axis Z' lies along and in the direction of the Z' axis, and the thickness or small dimension $t$ lies along and in the direction of the Y' axis. To obtain every possible orientation of the crystal 1, three angles are specified which have been chosen with respect to the crystallographic axes as follows: The polar coordinates of the shear or length axis Z' are $\theta$ and $\phi$ as shown in Fig. 1, where $\theta$ measures the angle that the plane determined by the shear axis Z' and the optic axis Z is rotated in a counterclockwise direction from the electric crystallographic axis X, and where $\phi$ represents the angle between the optic crystallographic axis Z and the shear axis Z' which is measured in this plane. These two angles $\theta$ and $\phi$ determine one edge of the crystal 1. The angle $\gamma$ represents the angle between the axis X', which lies along or in the direction of the width dimension $w$, and the optic crystallographic axis Z. The angle $\psi$ is the angle between the major plane of the crystal 1 and the plane determined by the Z and Z' axes.

The new system of axes X', Y' and Z' of the crystal plate 1 has direction cosines with respect to the crystallographic axes X, Y and Z given by the relation:

|    | X     | Y     | Z     |
|----|-------|-------|-------|
| X' | $l_1$ | $m_1$ | $n_1$ |
| Y' | $l_2$ | $m_2$ | $n_2$ | (5)
| Z' | $l_3$ | $m_3$ | $n_3$ |

In terms of the angles specified above and illustrated in Fig. 1, the quantities $l_1$ to $n_3$ given in Equation 5 may be evaluated as:

$$l_1 = -\cos\theta \cos\phi \cos\psi + \sin\theta \sin\psi$$
$$l_2 = \cos\theta \cos\phi \sin\psi + \sin\theta \cos\psi$$
$$l_3 = \cos\theta \sin\phi$$
$$m_1 = -\sin\theta \cos\phi \cos\psi - \cos\theta \sin\psi$$
$$m_2 = \sin\theta \cos\phi \sin\psi - \cos\theta \cos\psi \quad (6)$$
$$m_3 = \sin\theta \sin\phi$$
$$n_1 = \sin\phi \cos\psi$$
$$n_2 = +\sin\phi \sin\psi$$
$$n_3 = \cos\phi$$

where the angle $\psi$ is used for the specification of $l_1$ to $n_3$, the corresponding angle $\gamma$ may be obtained from the relation:

$$\cos\gamma = \sin\phi \cos\psi \quad (6a)$$

Hence, when $\theta$, $\phi$ and $\gamma$ are given, $\theta$, $\phi$ and $\psi$ are determined.

The value of the shear elastic constant $c_{66}$ is equal to:

$$c_{66}' = c_{11}(l_1 l_2 + m_1 m_2)^2 + 2c_{13} n_1 n_2 (l_1 l_2 + m_1 m_2)$$
$$+ 2c_{14}[(l_1 l_2 - m_1 m_2)(m_1 n_2 + m_2 n_1)$$
$$+ (n_1 l_2 + n_2 l_1)(l_1 m_2 + l_2 m_1)]$$
$$+ c_{33} n_1^2 n_2^2 + c_{44}[(m_1 n_2 + m_2 n_1)^2$$
$$+ (n_1 l_2 + n_2 l_1)^2] + c_{66}(l_1 m_2 - l_2 m_1)^2 \quad (7)$$

Substituting in the value of $l_1$ to $n_3$ given above, $$c_{66}' = (c_{11} - 2c_{13} + c_{33}) \sin^4\phi \sin^2\psi \cos^2\psi + c_{66} \cos^2\phi$$
$$+ c_{14} \sin\phi \left[ \sin 3\theta \cos\phi (2\cos 4\psi + \sin^2 2\psi \sin^2\phi) \right.$$
$$\left. + \cos 3\theta \sin 4\psi \left( \frac{1 + 3\cos^2\phi}{2} \right) \right]$$
$$+ c_{44} \sin^2\phi (1 - \sin^2\phi \sin^2 2\psi) \quad (8)$$

The temperature coefficient may be calculated using the formula:

$$c_{66} T_{c_{66}'} = (c_{11} T_{c_{11}} - 2c_{13} T_{c_{13}} + c_{33} T_{c_{33}}) \sin^4\phi \sin^2\psi \cos^2\psi$$
$$+ c_{66} T_{c_{66}} \cos^2\phi$$
$$+ c_{14} T_{c_{14}} \sin\phi \left[ \sin 3\theta \cos\phi (2\cos 4\psi \right.$$
$$\left. + \sin^2 2\psi \sin^2\phi) + \cos 3\theta \sin 4\psi \left( \frac{1 + 3\cos^2\phi}{2} \right) \right]$$
$$+ c_{44} T_{c_{44}} \sin^2\phi (1 - \sin^2\phi \sin^2 2\psi) \quad (9)$$

The values of $c_{11}$ etc. mentioned in Equation 9 were measured by W. Voight, "Lehrbuch der Kristallphysik," 1928, page 754, and others and are substantially as follows:

|   |   |   |
|---|---|---|
| $c_{11} = 85.1 \times 10^{10}$ | Dynes. cm.$^2$ | |
| $c_{13} = 14.1 \times 10^{10}$ | cm.$^2$ | |
| $c_{14} = 16.8 \times 10^{10}$ | cm.$^2$ | |
| $c_{33} = 105.3 \times 10^{10}$ | cm.$^2$ | (9a) |
| $c_{44} = 57.1 \times 10^{10}$ | cm.$^2$ | |
| $c_{66} = 39.1 \times 10^{10}$ | cm.$^2$ | |

The values of the temperature coefficients of the elastic constants of quartz are substantially as follows:

$$T_{c_{11}} = -48 \times 10^{-6}/c°$$
$$T_{c_{33}} = -250 \times 10^{-6}/c°$$
$$T_{c_{12}} = -2408 \times 10^{-6}/c°$$
$$T_{c_{13}} = -800 \times 10^{-6}/c°$$
$$T_{c_{14}} = +95 \times 10^{-6}/c°$$
$$T_{c_{44}} = -164 \times 10^{-6}/c°$$
$$T_{c_{66}} = +162 \times 10^{-6}/c°$$

Substituting these values into Equation 9 and dividing through by Equation 8, the temperature coefficient of the shear modulus $T_{c_{66}}$ is given by the numerical equation:

$$T_{c_{66}'} = \frac{\left[ -7900 \sin^4\phi \sin^2\psi \cos^2\psi + 6330 \cos^2\phi + 1595 \sin\phi \left[ \sin 3\theta \cos\phi (2\cos 4\psi + \sin^2 2\psi \sin^2\phi) \right. \right.}{162.2 \sin^4\phi \sin^2\psi \cos^2\psi + 39.1 \cos^2\phi + 16.8 \sin\phi \left[ \sin 3\theta \cos\phi (2\cos 4\psi + \sin^2 2\psi \sin^2\phi) \right.} \quad (10)$$

$$\frac{\left. \left. + \cos 3\theta \sin 4\psi \left( \frac{1+3\cos^2\phi}{2} \right) \right] - 9360 \sin^2\phi (1 - \sin^2\phi \sin^2 2\psi) \right] \times 10^{-6}}{\left. + \cos 3\theta \sin 4\psi \left( \frac{1+3\cos^2\phi}{2} \right) \right] + 57.1 \sin^2\phi (1 - \sin^2\phi \sin^2 2\psi)}$$

The other terms in Equation 2 are:

$$T_t = 14.8 - 5.8 \cos^2 \delta = (14.8 - 5.8 \sin^2 \phi \sin^2 \psi) \times 10^{-6}$$

since the direction cosine $\cos \delta = n_2$ $$T_\rho = 38.6 \times 10^{-6}$$

Hence the Equation 2 may be reduced to the numerical equation:

$$T_f = \left[ 4.5 + 5.8 \sin^2 \phi \sin^2 \psi \right.$$

$$\left. \frac{\begin{bmatrix} 3950 \sin^4 \phi \sin^2 \psi \cos^2 \psi + 3165 \cos^2 \phi + 797.5 \sin \phi \left[ \sin 3\theta \cos \phi (2 \cos 4\psi + \sin^2 2\psi \sin^2 \phi) \right. \\ \left. + \cos 3\theta \sin 4\psi \left( \frac{1+3 \cos^2 \phi}{2} \right) \right] - 4680 \sin^2 \phi (1 - \sin^2 \phi \sin^2 2\psi) \end{bmatrix}}{\begin{bmatrix} 162.2 \sin^4 \phi \sin^2 \psi \cos^2 \psi + 39.1 \cos^2 \phi + 16.8 \sin \phi \left[ \sin 3\theta \cos \phi (2 \cos 4\psi + \sin^2 2\psi \sin^2 \phi) \right. \\ \left. + \cos 3\theta \sin 4\psi \left( \frac{1+3 \cos^2 \phi}{2} \right) \right] + 57.1 \sin^2 \phi (1 - \sin^2 \phi \sin^2 2\psi) \end{bmatrix}} \times 10^{-6} \right] \quad (11)$$

By solving Equation 11 for all values of $\phi$, $\theta$ and $\psi$ or $\gamma$ which make Equation 11 vanish and $T_f = 0$, it will be noted that all of the zero temperature-frequency coefficient crystals may be determined for the thickness $t$ shear mode of vibration described.

The curves in Figs. 3 to 15 show some of the quartz crystal orientations as calculated from Equation 11 which produce zero temperature coefficient of frequency in a mode of vibration exhibiting shear strain at a frequency determined by the thickness $t$ of the crystal 1.

Referring to Fig. 3, curves are plotted from Equation 11 for $\gamma = 80$, 90 and 100 degrees with the corresponding values of $\theta$ and $\phi$ which produce zero temperature coefficient of frequency for the quartz plate 1. Thus, where $\gamma = 90$ degrees, $\theta = +90$ degrees or $-30$ degrees and $\phi = 35.3$ degrees, as indicated by the points marked "AT" in Fig. 3, the quartz plate 1 of Fig. 1 will have its width $w$ axis $X'$ along and parallel to an electric axis $X$ and its major plane and opposite electrode or major surfaces parallel to an electric axis $X$ and inclined $+35.3$ degrees with respect to the optic axis $Z$ to produce a zero temperature coefficient of $XY'$ shear vibration frequency when vibrated at a frequency determined by its thickness $t$. Similarly, where $\gamma = 90$ degrees, $\theta = +30$ degrees and $\phi = 49$ degrees as indicated by the point marked "BT" in Fig. 3, the quartz plate 1 of Fig. 1 will have its width axis $w$ along an electric axis and its major plane parallel to an electric axis $X$ and inclined 49 degrees with respect to the optic axis $Z$ to produce a zero temperature coefficient of frequency at the mode of vibration exhibiting shear strain and at a frequency determined by the thickness dimension $t$.

As illustrated by the curves where $\gamma = 90$ degrees and $\theta = 20$ degrees, 40 degrees, 80 degrees and 100 degrees in Figs. 3, 6, 8, 12 and 14, the crystal plate 1 may have its major plane and electrode faces inclined at an acute angle, as, for example $\pm 10$ degrees with respect to an electric axis $X$ and inclined at a selected corresponding acute angle $\phi$ with respect to the optic axis $Z$, as for example $\phi = 36$ degrees or 48 degrees to produce substantially zero temperature coefficient of frequency when vibrating in the $XY'$ shear vibration mode of motion at a frequency determined by the thin dimension $t$ of the plate 1.

Numerous other sets of values for $\theta$, $\phi$ and $\gamma$ may be selected from the curves in Fig. 3 to obtain quartz plates 1 having a zero temperature coefficient of frequency in the same high frequency shear mode of motion. It will be noted that the curves in Fig. 3 repeat every 120 degrees for $\theta$.

It will be noted that the twelve solid line curves in Figs. 4 to 15 show additional orientations of the quartz crystal plate 1 plotted for every ten degrees of angle $\theta$ from 0 to 110 degrees together with the corresponding values of angles $\phi$ and $\gamma$ to obtain a zero temperature coefficient of frequency when vibrating in the high frequency $XY'$ shear mode of motion along the thin dimension $t$ and $Y'$ axis of the crystal 1. It will be understood that the angle $\theta$ repeats in cycles of 120 degrees.

Figure 4:
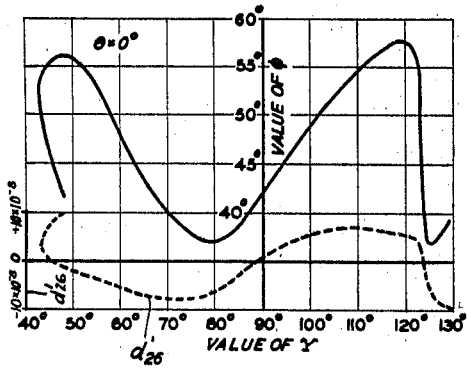
Figure 10:
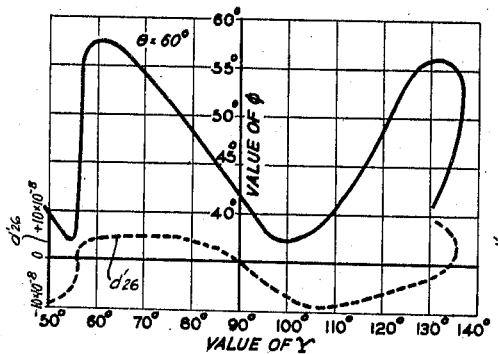

As illustrated by the curves in Figs. 4 and 10 where $\theta = 0$ degrees or 60 degrees, the electrode faces and the major plane of the quartz plate 1 may be parallel to one of the three mechanical crystallographic axes $Y$ and inclined at an acute angle $\phi$ with respect to the optic crystallographic axis $Z$, and the axes $Z'$ and $X'$ of the major plane of the plate 1 may be inclined with respect to said mechanical and optic crystallographic axes to produce a zero or other desired predetermined temperature-coefficient of shear vibration frequency at a frequency determined by the thickness $t$ of the quartz plate 1. As illustrated in Figs. 4 and 10, the thickness dimension $t$ of the plate 1 may be normal or perpendicular to a mechanical axis $Y$ and inclined at an angle to the optic axis $Z$ to produce the zero temperature coefficient of frequency.

Figure 7:
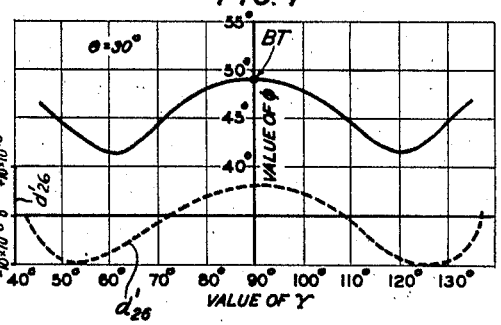
Figure 13:
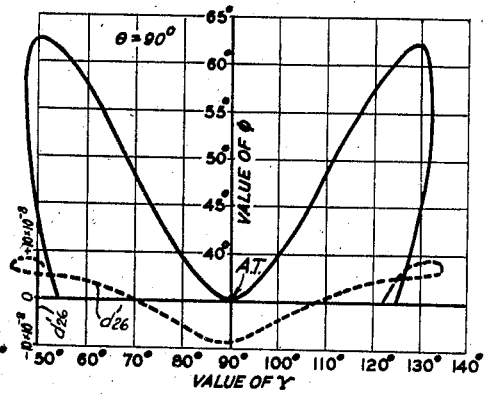

As shown by the curves in Figs. 7 and 13 where $\theta = 30$ degrees or 90 degrees, the electrode faces and the major plane of the quartz plate 1 may be parallel to an electric axis $X$ and inclined at an acute angle $\phi$ with respect to the optic axis $Z$, and the axes $Z'$ and $X'$ of the major plane may be inclined at acute angles with respect to said electric and optic axes to produce a zero or other desired predetermined temperature coefficient of $XY'$ shear vibration frequency at a given temperature and at a relatively high frequency determined by the thickness dimension $t$ between the electrode faces of the quartz plate 1. As shown in Figs. 7 and 13, the thickness dimension $t$ or axis $Y'$ may be normal to one of the three electric axes and inclined at an acute angle to the optic axis $Z$ and the other two orthogonal axes $X'$ and $Z'$ may be inclined at acute angles to said electric and optic axes.

As shown by the curves in Fig. 7 where $\theta = 30$ degrees the electrode faces and the major plane of the quartz plate 1 may be parallel to an electric axis $X$ and inclined at an acute angle $\phi =$ substantially 43 degrees with respect to the optic axis $Z$ and the edge axis $X'$ of the major plane of the plate 1 may be inclined at an acute angle $\gamma = 53$ degrees or 127 degrees with respect to the optic axis $Z$ to produce a zero temperature coefficient of shear vibration frequency at a frequency determined by the thickness dimension $t$ between the electrode faces of the quartz plate 1 and at the same time to obtain the maximum value of the piezoelectric driving constant $d'_{26}$ for $\theta=30$ degrees. The maximum or higher values of the piezoelectric driving moduli $d'_{26}$ for other orientations may be similarly obtained from the remaining $d'_{26}$ curves in the several figures.

As illustrated by the curves in Figs. 5, 6, 8, 9, 11, 12, 14 and 15, the major plane, faces and orthogonal axes X', Y' and Z' of the quartz plate 1 may be inclined to or disposed intermediate all of the electric, mechanical and optic crystallographic axes X, Y and Z to produce the $$T_f = \left[ 4.5 + 2.9(\sin^2 \phi \cos^2 \psi + \cos^2 \phi) \right. \tag{15}$$

$$\left. + \left[ \frac{-5877.5 \cos^2 \psi \sin^2 2\phi + 15790 \sin^2 \phi \sin^2 \psi + 10340 \sin \phi \times [\sin 3\theta \cos \phi (\cos^2 \psi \cos 2\phi - \sin^2 \psi)}{194 \cos^2 \psi \sin^2 2\phi + 292.8 \sin^2 \phi \sin^2 \psi - 172.4 \sin \phi \times [\sin 3\theta \cos \phi (\cos^2 \psi \cos 2\phi - \sin^2 \psi)} \right. \right.$$
$$\left. \left. \frac{+ \cos 3\theta \sin \psi \cos \psi (\cos 2\phi + \cos^2 \phi)] + 19525(\cos^2 \psi \cos^2 2\phi + \sin^2 \psi \cos^2 \phi)}{+ \cos 3\theta \sin \psi \cos \psi (\cos 2\phi + \cos^2 \phi)] + 200.5(\cos^2 \psi \cos^2 2\phi + \sin^2 \psi \cos^2 \phi)} \right] \right] \times 10^{-6}$$

selected temperature coefficient of shear vibration frequency at a frequency determined by the thickness $t$ of the quartz plate 1.

Another group of crystals for which zero temperature coefficient of shear frequency vibrations may be obtained, comprises the relatively low frequency ZX' shear vibration crystals wherein the frequency is determined not by the thickness dimension $t$ as illustrated in connection with Figs. 3 to 15 and Equation 11 but mainly by the larger dimensions $l$ and $w$ of the crystal 1. In this case, the frequency of such low frequency shear crystal 1 of square or nearly square shape may be given by the formula:

$$f = \frac{1.25}{lx' + lz'} \sqrt{\frac{1}{\rho S'_{55}}} \tag{12}$$

and the resultant temperature coefficient of frequency thereof is:

$$T_f = -\frac{[T_{l'x} + T_{l'z} + T_\rho + T_{S'_{55}}]}{2} \tag{13}$$

where the crystal 1 is square or nearly square, where the length in the X' axis direction $l_{x'} = w$ and is substantially equal to the length in the Z' axis direction $l_{z'} = l$, as illustrated in Fig. 1, where $\rho$ is the density, and where $S'_{55}$ is the elastic constant. The thickness dimension $t$ of the crystal 1 is assumed to lie along the Y' axis as illustrated in Fig. 1.

For this case, the shearing constant $S_{55}'$ is given by the equation:

$S_{55}' = (S_{11} - 2S_{13} + S_{33}) \cos^2 \psi \sin^2 2\phi + S_{66} \sin^2 \phi \sin^2 \psi + 4S_{14} \sin \phi [\sin 3\theta \cos \phi (\cos^2 \psi \cos 2\phi - \sin^2 \psi) + \cos 3\theta \sin \psi \cos \psi (\cos 2\phi + \cos^2 \phi)] + S_{44} [\cos^2 \psi \cos^2 2\phi + \sin^2 \psi \cos^2 \phi]$ (14)

The values of the S elastic constants of quartz referred to in Equation 14 are substantially as follows:

$$S_{11} = 127.2 \times 10^{-14}$$
$$S_{13} = -15.2 \times 10^{-14}$$
$$S_{14} = -43.1 \times 10^{-14}$$
$$S_{33} = 99.0 \times 10^{-14} \tag{14a}$$
$$S_{44} = 200.5 \times 10^{-14}$$
$$S_{66} = 292.8 \times 10^{-14}$$

The temperature coefficients of the S elastic constants of quartz are substantially as follows:

$$Ts_{11} = +13 \times 10^{-6} \text{ per degree C.}$$
$$Ts_{13} = -347 \times 10^{-6} \text{ per degree C.}$$
$$Ts_{14} = +120 \times 10^{-6} \text{ per degree C.} \tag{14b}$$
$$Ts_{33} = +213 \times 10^{-6} \text{ per degree C.}$$
$$Ts_{44} = +194.6 \times 10^{-6} \text{ per degree C.}$$
$$Ts_{66} = -108 \times 10^{-6} \text{ per degree C.}$$

While the temperature coefficients of the S and C elastic constants of quartz herein given in Equation 14b and Equation 9b are correct within about 5 per cent, it will be understood that they may be more accurately determined by more accurate measurements.

Inserting in Equation 14 the numerical values of the temperature coefficients and the S constants of quartz as given in Equations 14a and 14b, the equation for the temperature coefficient of frequency becomes The low frequency shear crystals having zero temperature coefficient of frequency are obtained by selecting the values of $\theta$, $\phi$ and $\psi$ or $\gamma$ in Equation 15 which make the resultant temperature coefficient of frequency $T_f$ equal to zero.

The curves in Figs. 16 to 25 show some of the quartz crystal orientations as obtained from Equation 15 which produce substantially zero temperature coefficient of frequency in a mode of vibration exhibiting shear strain at a frequency determined by the equal dimensions $l$ and $w$ of the quartz crystal plate 1.

It will be noted that the curves shown in Figs. 17 to 24 are similar to those of Figs. 4 to 15 but illustrate the orientation angles and corresponding values of the piezoelectric moduli $d'_{25}$ for shear vibrations at a relatively lower frequency as determined by the large dimension $l$ of the crystal plate 1. The curves in Figs. 17 to 24 are plotted for every 15 degrees of angle $\theta$ from 0 to 105 degrees with the corresponding values of angles $\phi$ and $\gamma$. The angle $\theta$ repeats in cycles of 120 degrees.

Referring to Fig. 16, the curve is plotted for $\gamma = 90$ degrees with the corresponding values of $\theta$ and $\phi$ which produce a zero temperature coefficient of frequency as obtained from Equation 15. It will be noted that, where $\gamma = 90$ degrees, $\theta = 90$ degrees and $\phi = 38.2$ degrees as indicated by the points marked "CT" in Fig. 16, the square quartz plate 1 of Fig. 1 will have its width axis $w$ along an electrical axis X and its major plane and opposite electrode or major surfaces parallel to an electric axis and inclined +38.2 degrees with respect to the optic axis Z to produce a zero temperature coefficient of frequency when vibrated at a frequency determined by the large dimensions $l$ and $w$.

Similarly, where $\gamma = 90$ degrees, $\theta = 30$ degrees and $\phi = 53$ degrees as indicated by the point marked "DT" in Fig. 16, the square quartz plate 1 of Fig. 1 will have its major plane parallel to an electric axis X and inclined 53 degrees with respect to the optic axis Z to obtain zero temperature coefficient of frequency at the low frequency ZX' shear mode of vibration. Numerous other sets of values of $\theta$, $\phi$ and $\gamma$ may be similarly selected from the curve of Fig. 16 and from Equation 15 to obtain other square-shaped low-frequency quartz crystals having zero temperature coefficient of frequency.

As illustrated by the curves where $\gamma = 90$ degrees and $\theta = 15$ degrees, 45 degrees, 75 degrees and 105 degrees in Figs. 16, 18, 20, 22 and 24, the crystal plate I may have its major plane and electrode faces inclined at an acute angle as for example up to about ±15 degrees with respect to an electric axis X and inclined at a selected corresponding acute angle with respect to the optic axis Z, as for example, $\phi=40$ degrees or 53 degrees, to produce substantially zero temperature coefficient of frequency when vibrating in the ZX' shear vibration mode of motion at a frequency determined by the larger dimension $l$ of the plate I.

Figure 21:
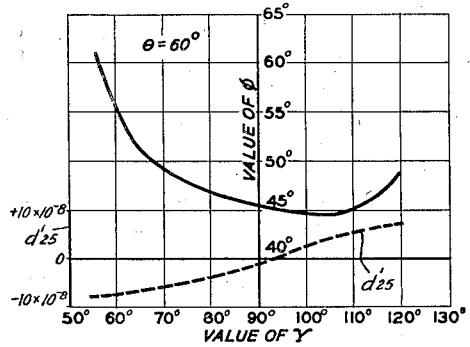

As illustrated by the curves in Figs. 17 and 21 where $\theta=0$ degrees or 60 degrees, the electrode faces and the major plane of the quartz plate I may be parallel to one of the three mechanical crystallographic axes Y and inclined at an acute angle $\phi$ to the optic axis Z, and the axes Z' and X' of the major plane of the plate I may be inclined with respect to said mechanical and optic axes to produce a zero or desired temperature coefficient of shear frequency at a frequency of vibration determined by the large dimension $l$ of the quartz plate I.

Figure 19:
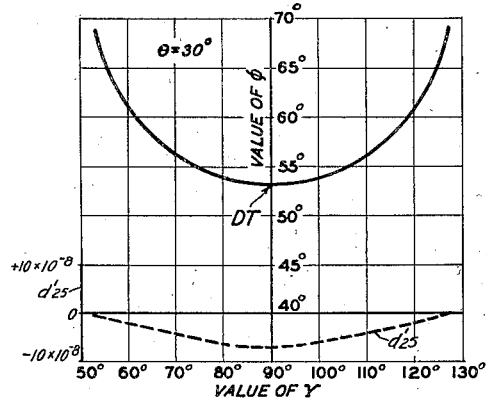
Figure 23:
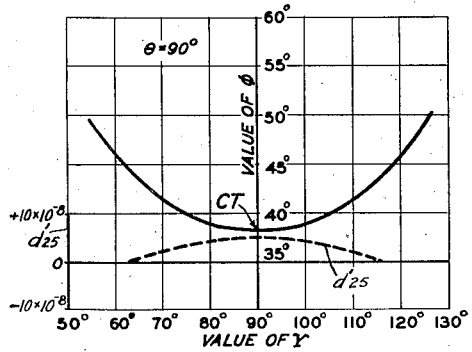

As illustrated by the curves in Figs. 19 and 23 where $\theta=30$ degrees or 90 degrees, the electrode faces and the major plane of the quartz plate I may be parallel to an electric axis X and inclined at an acute angle $\phi$ with respect to the optic axis Z, and the axes Z' and X' of the major plane may be inclined at acute angles with respect to said electric and optic axes to produce a zero temperature coefficient of shear vibration at a frequency determined by the larger dimension $l$ of the quartz plate I.

It will be noted that Equation 11 defines a rectangular quartz plate and Equation 15 a square or nearly square quartz plate, the axis Z' of which is specified with respect to the crystallographic axes by the polar coordinate angles $\theta$ and $\phi$ which determine respectively the plane of the axis Z' measured from the electric axis X and the angle of the axis Z' in that ZZ' plane measured from the optic axis Z, and the width axis X' of which is at an angle $\gamma$ from the optic axis Z, these angles $\theta$, $\phi$ and $\gamma$ being so chosen that simultaneously they satisfy Equation 11 or 15 for a zero or other specified value of the temperature coefficient of frequency $T_f$. These angles include not only the case of $\gamma=90$ degrees and $\theta=90$ degrees or 30 degrees where the major plane of the crystal plate is parallel to an electric axis X, but also other angles where the major plane of the crystal is not parallel to any electric axis thereof.

Numerous other sets of values for $\theta$, $\phi$ and $\gamma$ may be selected from Equations 11 and 15 and from the curves in Figs. 3 to 25, to obtain quartz plates I which may have substantially a zero or other desired temperature coefficient of shear vibration frequency, and which may also at the same time have the maximum or higher values of piezoelectric activity $d'_{25}$ or $d'_{26}$.

The variation of the piezoelectric moduli of quartz as a function of the orientation for exciting the desired vibration piezoelectrically includes the $d'_{26}$ constant which is the constant connecting the $E_{y'}$ electric field with the desired XY' shear strain where $E_{y'}$ is an electric field in the Y' direction. The piezoelectric activity of the quartz plate I may be expressed quantitatively as the coupling between the electrical and mechanical systems of the crystal I and is a function of the piezoelectric and electric moduli of the vibration involved and the dielectric constant of the crystal plate I.

The piezoelectric drive of the quartz plate I when excited in the high frequency XY' shear mode of vibration illustrated in connection with Figs. 3 to 15 and Equation 11 depends mainly on the high frequency shear driving constant $d'_{26}$ thereof.

The piezoelectric drive of the quartz plate I when excited in the low frequency ZX' shear mode of vibration as illustrated in connection with Figs. 16 to 25 and Equation 15 depends mainly on the low frequency shear driving constant $d'_{25}$ thereof.

The values of the low-frequency shear piezoelectric driving constant $d'_{25}$ and the high-frequency shear piezoelectric driving constant $d'_{26}$ are given by the equations:

$$d'_{25}=-d_{11} \sin \phi \; [\cos 3\theta \sin 2\psi \; (1+\cos^2 \phi) + 2 \sin 3\theta \cos \phi \cos 2\psi] - d_{14} (\cos^2 \phi - \sin^2 \phi \cos^2 \psi) \quad (16)$$

$$d'_{26}=2d_{11} [\cos 3\theta \cos \phi \cos \psi \; (\cos 2\psi - \sin^2 \psi (1+\cos^2 \phi))] - \sin 3\theta \sin \psi \; [\cos^2 \psi (1+\cos^2 \phi) + \cos^2 \phi \cos 2\psi]+d_{14} \sin \phi \cos \phi \sin \psi \quad (17)$$

Other piezoelectric driving constants $d'_{21}$, $d'_{22}$, $d'_{23}$, and $d'_{24}$ may be present but do not effectively drive the particular shear mode of motion herein considered.

It will be understood that orientations having the maximum or higher orders of magnitude of piezoelectric driving constant $d'_{25}$ or $d'_{26}$ with respect to the several other constants $d'_{21}$, $d'_{22}$, $d'_{23}$, $d'_{24}$, that may be present, may be obtained from Equation 16 or 17.

Values of $d'_{25}$ for the several different orientations of quartz crystals plotted in Figs. 17 to 24 are shown in the corresponding dotted-line curves of Figs. 17 to 24; and Values of $d'_{26}$ for the several different orientations plotted in Figs. 4 to 15 are shown in the corresponding dotted line curves of Figs. 4 to 15.

Figure 5:
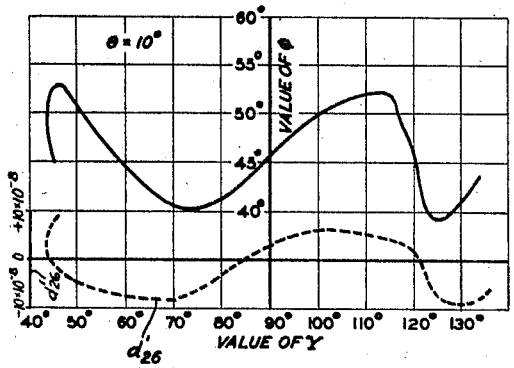
Figure 6:
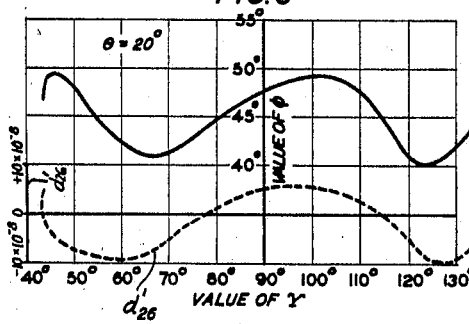
Figure 8:
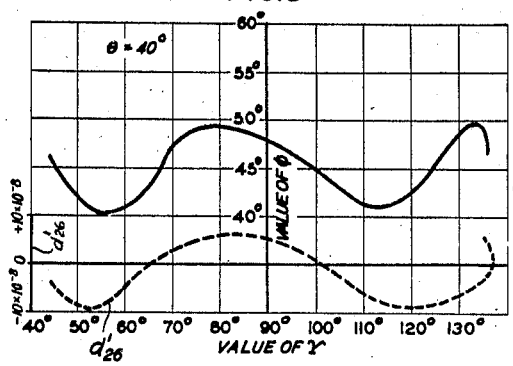
Figure 9:
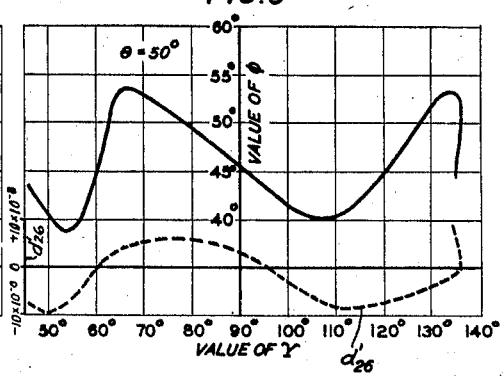
Figure 11:
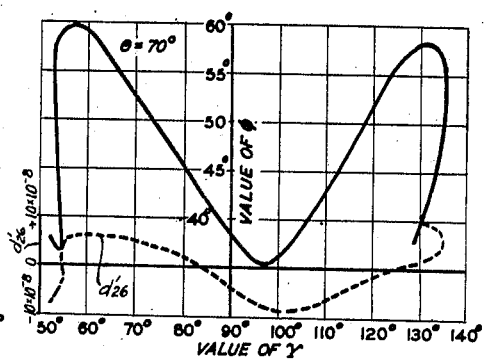
Figure 12:
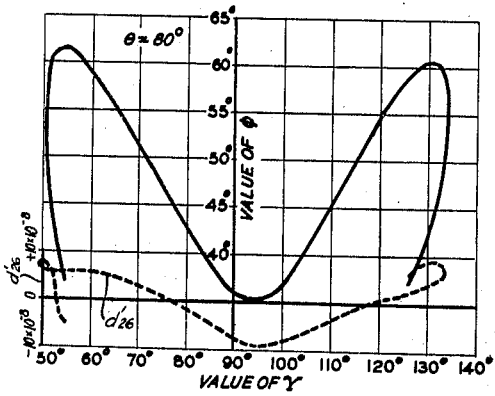
Figure 14:
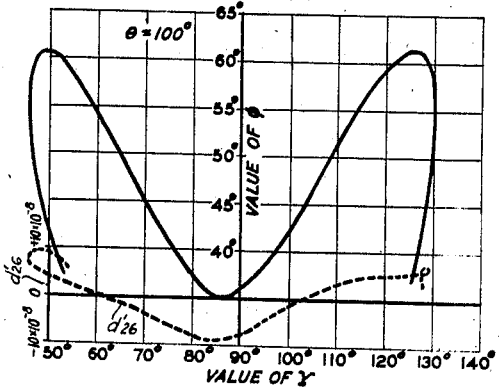
Figure 15:
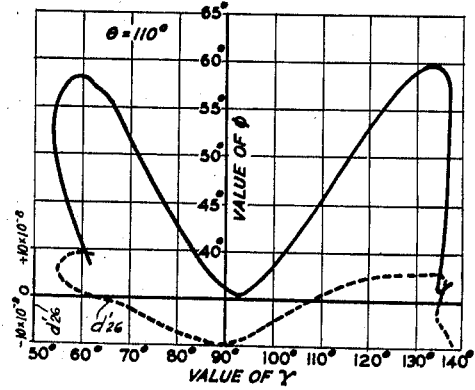

Referring to the dotted line curves of Figs. 4 to 15, it will be noted that some of the quartz crystal orientations which give the higher values of piezoelectric driving constant $d'_{26}$ and consequently the more active quartz crystals having zero temperature coefficient of frequency when vibrating in the high-frequency XY' shear mode at a frequency determined by the thickness dimension $t$ include the following:

Fig. 4 $\theta= 0°$, $\gamma= 49°$, $\phi=40°$
$\theta= 0°$, $\gamma= 60°$ to $80°$, $\phi=37°$ to $48°$
$\theta= 0°$, $\gamma=100°$ to $123°$, $\phi=48°$ to $58°$
$\theta= 0°$, $\gamma=130°$, $\phi=40°$
Fig. 5 $\theta= 10°$, $\gamma= 48°$, $\phi=53°$
$\theta= 10°$, $\gamma= 50°$ to $75°$, $\phi=40°$ to $50°$
$\theta= 10°$, $\gamma= 95°$ to $115°$, $\phi=47°$ to $53°$
$\theta= 10°$, $\gamma=130°$, $\phi=40°$
Fig. 6 $\theta= 20°$, $\gamma= 60°$, $\phi=43°$
$\theta= 20°$, $\gamma=127°$, $\phi=43°$
Fig. 7 $\theta= 30°$, $\gamma= 53°$, $\phi=43.5°$
$\theta= 30°$, $\gamma=125°$, $\phi=42.5°$
Fig. 8 $\theta= 40°$, $\gamma= 53°$, $\phi=41°$
$\theta= 40°$, $\gamma=120°$, $\phi=42.5°$
Fig. 9 $\theta= 50°$, $\gamma= 51°$, $\phi=41°$
$\theta= 50°$, $\gamma=112°$, $\phi=41°$
Fig. 10 $\theta= 60°$, $\gamma= 50°$, $\phi=40°$
$\theta= 60°$, $\gamma=108°$, $\phi=39°$
Fig. 11 $\theta= 70°$, $\gamma=101°$, $\phi=37°$
$\theta= 70°$, $\gamma=130°$, $\phi=40°$
Fig. 12 $\theta= 80°$, $\gamma= 95°$, $\phi=35°$
Fig. 13 $\theta= 90°$, $\gamma= 90°$, $\phi=35.5°$
Fig. 14 $\theta=100°$, $\gamma= 87°$, $\phi=35°$
Fig. 15 $\theta=110°$, $\gamma= 89°$, $\phi=36°$ It will be noted that the quartz plate designated as "AT" in Fig. 13 having an orientation $\theta=90$ degrees, $\gamma=90$ degrees and $\phi=35.5$ degrees has a relatively large driving constant $d'_{26}=-8.05$ as shown by the dotted or broken curve of Fig. 13. The $d'_{25}$ constant thereof equals 7.14, and the $d'_{21}$, $d'_{22}$, $d'_{23}$, $d'_{24}$ constants thereof are zero.

The quartz plate designated as "BT" in Fig. 7 having an orientation $\theta=30$ degrees, $\gamma=90$ degrees and $\phi=49$ degrees has a piezoelectric driving constant $d'_{26}$ thereof equal to 6.29 as shown by the dotted curve of Fig. 7. The $d'_{25}$ constant thereof equals 7.03, and the $d'_{21}$, $d'_{22}$, $d'_{23}$, $d'_{24}$ constants thereof are zero.

Figure 20:
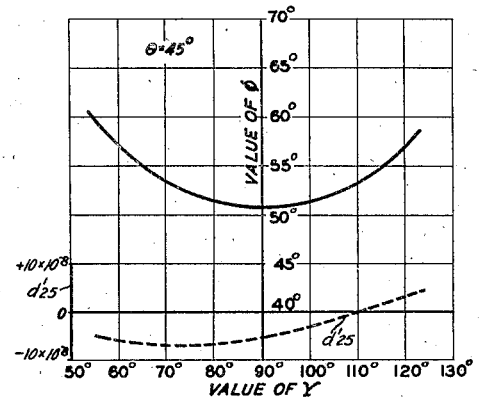
Figure 22:
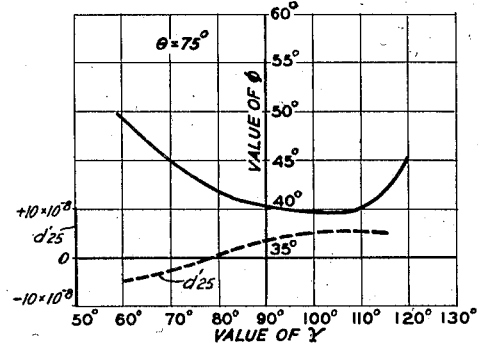
Figure 24:
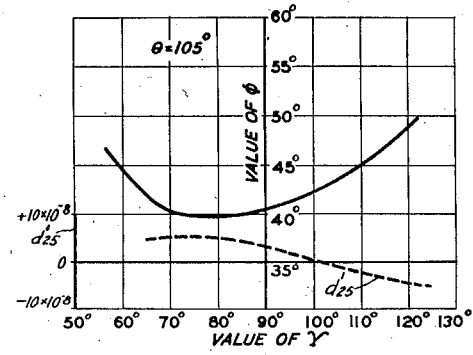

Referring to the dotted line curves of Figs. 17 to 24, it will be noted that some of the quartz crystal orientations which give the higher values of piezoelectric driving constant $d'_{25}$ and consequently the more active quartz crystals having zero temperature coefficient of frequency when vibrating in the shear mode of motion at a frequency determined by the large dimension of the plate 1, include the following:

Fig. 17 $\theta=\phantom{00}0°$, $\gamma=119°$, $\phi=55°$–$30'$
Fig. 18 $\theta=\phantom{0}15°$, $\gamma=107°$, $\phi=53°$
Fig. 19 $\theta=\phantom{0}30°$, $\gamma=\phantom{0}90°$, $\phi=53°$
Fig. 20 $\theta=\phantom{0}45°$, $\gamma=\phantom{0}74°$, $\phi=52°$–$34'$
Fig. 21 $\theta=\phantom{0}60°$, $\gamma=\phantom{0}58°$, $\phi=58°$
Fig. 22 $\theta=\phantom{0}75°$, $\gamma=105°$, $\phi=39°$–$30'$
Fig. 23 $\theta=\phantom{0}90°$, $\gamma=\phantom{0}90°$, $\phi=38°$–$20'$
Fig. 24 $\theta=105°$, $\gamma=\phantom{0}74°$, $\phi=39°$–$50'$ Fig. 25 is a contour graph illustrating numerous additional orientations for the quartz plate 1, in terms of the angles $\theta$, $\phi$ and $\gamma$ which may be utilized to produce substantially a zero temperature coefficient of frequency when excited in the low-frequency ZX' shear mode of vibration at a frequency determined by the larger or electrode surface dimensions of the quartz plate 1. The numbers on the solid line curves in Fig. 25 give the values of $\phi$ in degrees. The corresponding values of $\gamma$ and $\theta$ to produce such zero temperature coefficient of frequency may be obtained by reference to the corresponding abscissae and ordinate values as given. Additional orientations to produce the zero temperature coefficient of frequency may be obtained by interpolation or from Equation 15.

The two dotted lines in Fig. 25 show the paths along which the piezoelectric constant $d'_{25}$ of such zero temperature coefficient quartz crystal plates is a maximum and accordingly such quartz plates 1 having orientation angles of $\phi$, $\theta$ and $\gamma$ corresponding to the path of such dotted line curves may have the larger values of piezoelectric activity as well as substantially zero temperature coefficient of frequency when excited in the particular low frequency shear mode of vibration referred to. For example, as indicated by the point designated "CT" on the upper dotted line curve of Fig. 25, the quartz plate 1 may have an orientation of $\phi=38$ degrees $20'$, $\theta=90$ degrees and $\gamma=90$ degrees to produce zero temperature coefficient of frequency and obtain a relatively large value of piezoelectric activity as measured by the piezoelectric constant $d'_{25}$. Other orientations may be similarly selected from the dotted line curves of Fig. 25 to obtain quartz plates having zero temperature coefficient of frequency and large piezoelectric activity.

It will be noted that where crystal plates are cut from a natural quartz crystal in such a manner that their principal or major plane is rotated about one of the electric crystallographic or X axes, there are two relatively high-frequency quartz crystal plates as indicated as AT and BT in Fig. 3, for example, that will give a zero temperature coefficient of frequency when vibrating in shear along their thinnest dimension $t$, and also that there are two relatively low-frequency quartz crystal plates, indicated as CT and DT in Fig. 15, for example, that will give a zero temperature coefficient of frequency when vibrating in shear at a frequency determined by their large dimensions. If, however, the crystal plates are cut with their principal or major planes rotated by two or more angles from the crystallographic axes, there are an infinity of quartz plates 1 which will give a zero temperature coefficient of frequency for the high frequency shear mode of vibration as given by Equation 11 and for the low-frequency shear mode of vibration as given by Equation 15. These equations and the curves of Figs. 3 to 25 derived therefrom specify by three angles the surfaces along which all of the crystals so oriented will possess a zero temperature coefficient of frequency. Of these crystals, some may have not only the first but also the second derivative of frequency by temperature equal to zero to obtain crystals similar in constancy of frequency to the crystal indicated as GT in U. S. Patent 2,204,762, dated June 18, 1940, which has a very constant frequency throughout a very wide range of temperatures.

It will be understood that by suitably orienting the surfaces and axes X', Y' and Z' of a quartz crystal 1 with respect to the crystallographic axes X, Y and Z thereof, the temperature coefficient of frequency thereof may be rendered practically zero, the amount of power that can be controlled without fracture of the crystal 1 may be increased, the frequency spectrum may be simplified, and the piezoelectric activity may be increased, and that such quartz crystals may be rigidly clamped in the holder and utilized as circuit elements for frequency control at radio frequencies in any suitable system such as an oscillation generating system or an electric wave filter system.

The secondary frequency spectrum of the quartz plate may consist of overtones of low frequency vibrations which are mechanically coupled to the desired vibration and may cause discontinuities or "hops" in the characteristic temperature-frequency curves of the crystal. The plate may be so adjusted that there are no such discontinuities in the region where it is expected to operate or the effect of any secondary spectrum may be minimized or eliminated by selecting such angular orientations of the crystal that the magnitude of the elastic constant responsible for the undesired coupling is reduced to zero or other ineffective value without at the same time introducing other undesired couplings, in accordance with the principles disclosed in a copending application Serial No. 702,334, filed December 11, 1933, by W. P. Mason and R. A. Sykes, now U. S. Patent 2,173,589 dated September 19, 1939, and in applicant's paper "Electrical wave filters employing quartz crystals as elements," Bell System Technical Journal, vol. XIII, pages 405–452, July 1934. As has been shown and claimed in such copending application Serial No. 702,334 filed December 14, 1933, by W. P. Mason and R. A. Sykes, the mechanical coupling of a desired mode to undesired modes of vibration may be reduced to an ineffective value so that the vibrating piezoelectric body may have a resonance frequency which is effectively a function of a desired dimension.

The values of the temperature coefficients of the six elastic constants or moduli of quartz which are given in Equations 9b and 14b and which may be obtained by direct measurement or indirectly by measuring the frequency-temperature coefficients of quartz rods or plates vibrating in a fundamental mode of motion substantially free from coupling with any other mode of motion therein, may be utilized to substantially locate all the regions of zero or other desired predetermined temperature coefficient of frequency for any type of vibration in long thin rods, plates or in other shapes of quartz bodies as well as in those particularly illustrated herebefore.

The six principal modes of vibration are the three extensional modes $X_{x'}$, $Y_{y'}$, and $Z_{z'}$, and the three shear modes $X_{y'}$, $Y_{z'}$ and $Z_{x'}$. The $X_{y'}$ shear mode of motion and the $Z_{x'}$ shear mode of motion are particularly disclosed herein in connection with the Equations 11 and 15, respectively, and the graphs derived therefrom as shown in Figs. 3 to 25.

But it will be understood that all the regions of zero or other desired predetermined temperature coefficient of frequency may be located for any type of vibration in a similar manner from the temperature coefficients of the elastic constants of quartz, by using the formulae for the elastic constant as affected by the angular orientation.

For example, the frequency of a long thin quartz bar or rod is governed by the $S_{22}$ coefficient rather than by the $C_{66}$ coefficient as given in Equation 1; and calculations, following the principles herein given, may be similarly made to obtain all the regions that produce a zero or other desired predetermined temperature coefficient of frequency in the longitudinal or extensional mode of vibration for all rotative positions parallel or intermediate the crystallographic axes of the quartz bar. In a particular case such a relatively long thin quartz bar having its major or longitudinal axis perpendicular to an electric axis and inclined at an angle substantially +4.5 degrees with respect to the orthogonal mechanical crystallographic axis, produces substantially zero temperature coefficient of frequency when excited, as by a pair of opposite electrodes on the two opposite major surfaces thereof perpendicular to the electric axis, in the fundamental longitudinal mode of vibration free from coupling with other modes of vibration therein such as flexural modes. Suitable dimensional ratios such as for example a ratio of length of 20 millimeters, width of 3 millimeters and thickness of 0.5 millimeter may be utilized in such a long bar crystal to avoid undesired flexural coupled modes.

It will be understood that, while the orientation angles herein disclosed are approximately correct for producing a selected temperature coefficient of frequency, variations may be made therein in practice to adjust the temperature coefficient of frequency of the quartz body to a more precise value.

For additional information in respect to the general elastic and piezoelectric equations for crystals and the elastic and piezoelectric constants of quartz, reference is made to application Serial No. 702,334, filed December 14, 1933, by W. P. Mason and R. A. Sykes, now U. S. Patent 2,173,589 dated September 19, 1939, and application Serial No. 728,640, filed June 2, 1934, by F. R. Lack, G. W. Willard, I. E. Fair, now U. S. Patent 2,218,200 dated October 15, 1940, and to the other references herein given.

Although this invention has been described and illustrated in relation to specific arrangements, it is to be understood that it is capable of application in other organizations and is therefore not to be limited to the particular embodiments disclosed, but only by the scope of the appended claims and the state of the prior art.

What is claimed is:

1. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, said thickness dimension being made of a value in accordance with the value of said frequency, the width or X' axis of said major plane being inclined at an acute angle with respect to the Z axis, the length or Z' axis of said major plane being inclined at an acute angle with respect to said Z axis, and the plane formed by said Z and Z' axes being inclined at a selected angle with respect to an X axis as measured in the plane of said X axis and a Y axis, said acute angles and said selected angle being a set of angles of values substantially as given by the solid line curves of Figs. 4 to 15 at a point thereon corresponding to an effective or relatively large value near to a maximum value of the shear piezoelectric driving constant as given by the broken line curves of said Figs. 4 to 15, to obtain a relatively small temperature coefficient of frequency and a relatively large electromechanical coupling when vibrated in said shear mode of motion.

2. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, said thickness dimension being made of a value in accordance with the value of said frequency, the width or X' axis of said major plane being inclined at a selected angle with respect to the Z axis, the length or Z' axis of said major plane being inclined at an acute angle with respect to said Z axis, and the plane formed by said Z and Z' axes being inclined at a selected angle with respect to an X axis as measured in the plane of said X axis and a Y axis, said angles being a set of angles of values substantially as given by the solid line curves of Figs. 7 and 13 at a point thereon where said first-mentioned angle is one of the values less than 90 degrees and greater than 90 degrees, said point corresponding to an effective or relatively large value near to a maximum value of the piezoelectric constant as given by the broken line curves of said Figs. 7 and 13, to obtain a relatively small temperature coefficient of frequency and a relatively large electromechanical coupling when vibrated in said thickness shear mode of motion.

3. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, said thickness dimension being made of a value in accordance with the value of said frequency, the width or X' axis of said major plane being inclined at a selected angle with respect to the Z axis, the length or Z' axis of said major plane being inclined at an acute angle with respect to said Z axis, and the plane formed by said length axis and said Z axis being inclined with respect to a compression positive X axis at a positive angle of substantially 30 degrees as measured in the plane of said X axis and a Y axis, said angles being a set of angles of values substantially as given by the solid line curve of Fig. 7 at a point thereon where said first-mentioned angle is one of the values less than 90 degrees and greater than 90 degrees, said point corresponding to an effective or relatively large value of piezoelectric constant as given by the broken line curve of said Fig. 7, to obtain a relatively small temperature coefficient of frequency and a relatively large electromechanical coupling when vibrated in said shear mode of motion.

4. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, said thickness dimension being made of a value in accordance with the value of said frequency, the width or X' axis of said major plane being inclined at a selected angle with respect to the Z axis, the length or Z' axis of said major plane being inclined at an acute angle with respect to said Z axis, and the plane formed by said length axis and said Z axis being inclined with respect to a compression positive X axis at a positive angle of substantially 90 degrees as measured in the plane of said X axis and a Y axis, said angles being a set of angles of values substantially as given by the solid line curve of Fig. 13 at a point thereon where said first-mentioned angle is one of the values less than 90 degrees and greater than 90 degrees, said point corresponding to an effective or relatively large value of piezoelectric constant as given by the broken line curve of said Fig. 13, to obtain a relatively small temperature coefficient of frequency and a relatively large electromechanical coupling when vibrated in said thickness shear mode of motion.

5. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, the width or X' axis of said major plane being inclined at a selected angle with respect to the Z axis, the length or Z' axis of said major plane being inclined at an acute angle with respect to said Z axis, and the plane formed by said length axis Z' and said Z axis being disposed with respect to a compression positive X axis at a positive angle of substantially 0 degrees as measured in the plane of said X axis and a Y axis, said angles being a set of angles of values substantially as given by the solid line curve of Fig. 4 at a point thereon where said first-mentioned angle is one of the values less than 90 degrees and greater than 90 degrees, said point corresponding to an effective or relatively large value of piezoelectric constant as given by the broken line curve of said Fig. 4, to obtain a relatively small temperature coefficient of frequency and a relatively large electromechanical coupling when vibrated in said shear mode of motion.

6. A quartz piezoelectric element having a substantially rectangular major plane, and means for applying an electric field thereto in the direction of its thickness axis or smallest dimension perpendicular to said major plane for vibrating said element in a shear mode of motion at a frequency which is determined substantially by said thickness axis dimension, the width or X' axis of said major plane being inclined at a selected angle with respect to the Z axis, the length or Z' axis of said major plane being inclined at an acute angle with respect to said Z axis, and the plane formed by said length axis and said Z axis being disposed with respect to a compression positive X axis at a positive angle of substantially 60 degrees as measured in the plane of said X axis and a Y axis, said angles being a set of angles of values substantially as given by the solid line curve of Fig. 10 at a point thereon where said first-mentioned angle is one of the values less than 90 degrees and greater than 90 degrees, said point corresponding to an effective or relatively large value of piezoelectric constant as given by the broken line curve of said Fig. 10, to obtain a relatively small temperature coefficient of frequency and a relatively large electromechanical coupling when vibrated to said shear mode of motion.

7. A quartz piezoelectric element having a substantially square major plane, and means for applying an electric field thereto in the direction of its thickness axis dimension perpendicular to said major plane for vibrating said element in a shear mode of motion at a frequency which is determined substantially by the dimension of said major plane, said dimensions of said major plane being made of values in accordance with the value of said frequency, the width or X' axis of said major plane being inclined at a selected angle with respect to the Z axis, the length or Z' axis of said major plane being inclined at an acute angle with respect to said Z axis, and the plane formed by said length axis and said Z axis being inclined at a selected angle with respect to an X axis as measured in the plane of the X and Y axes, said angles being a set of related angles of values substantially as given by the solid line curves of Figs. 17 to 25 at a point thereon where said first-mentioned angle is one of the values less than 90 degrees and greater than 90 degrees said point corresponding to an effective or relatively large value near to a maximum value of the piezoelectric constant as given by the broken line curves of said Figs. 17 to 25, to obtain a relatively small temperature coefficient of frequency and a relatively large electromechanical coupling when vibrated in said shear mode of motion.

8. A piezoelectric quartz crystal plate of low temperature coefficient of shear mode frequency, said plate having substantially square major surfaces, said major surfaces having one edge extending along an X' axis and another edge perpendicular to said X' axis edge and extending along a Z' axis, said X' axis dimension and said Z' axis dimension being made of values in accordance with the value of said frequency, said X' axis being inclined with respect to the Z axis at an angle γ which is substantially one of the positive angles within the range from 55 to 85 and from 95 to 125 degrees, said Z' axis being inclined with respect to the Z axis at a positive angle φ within the range of angles substantially from 38 to 70 degrees, and the plane formed by said Z and Z' axes being disposed with respect to a compression positive X axis at a positive angle θ as measured in the plane of said X axis and a Y axis, said γ φ and θ angles being a set of γ, φ and θ angles of related values substantially as given by the solid line curves of Figs. 17 to 25 at a point corresponding to an effective or relatively large value of the piezoelectric driving constant as given by the broken line curves thereof.

9. A quartz piezoelectric element having a substantially square major plane, and means for applying an electric field thereto in the direction of its thickness axis dimension perpendicular to said major plane for vibrating said element in a shear mode of motion at a frequency which is determined substantially by the dimensions of said major plane, said dimensions of said major plane being made of values in accordance with the value of said frequency, the width or X' axis of said major plane being inclined at a selected angle with respect to the Z axis, the length or Z' axis of said major plane being inclined at an acute angle with respect to said Z axis, and the plane formed by said Z' and Z axes being inclined at a selected angle with respect to an X axis as measured in the plane of said X axis and a Y axis, said angles being a solid line curves of Figs. 19 and 23 at a point thereon where said first-mentioned angle is one of the values within the range from more than 60 to less than 90 degrees and from more than 90 to less than 120 degrees, to obtain a relatively small temperature coefficient of frequency and a relatively large electromechanical coupling when vibrated in said shear mode of motion.

10. A quartz piezoelectric element having a substantially square major plane, and means for applying an electric field thereto in the direction of its thickness axis dimension perpendicular to said major plane for vibrating said element in a shear mode of motion at a frequency which is determined substantially by the dimensions of said major plane, the width or X' axis of said major plane being inclined at a selected angle with respect to the Z axis, the length of Z' axis of said major plane being inclined at an acute angle with respect to said Z axis, and the plane formed by said length axis Z' and said Z axis being inclined at a selected angle with respect to an X axis as measured in the plane of said X axis and a Y axis, said angles being a set of angles of values substantially as given by the solid line curves of Fig. 25 substantially at a point thereon where said first-mentioned angle is one of the values less than 90 degrees and greater than 90 degrees, said point being closely adjacent a broken line curve of said Fig. 25, to obtain a relatively small temperature coefficient of frequency and a relatively large electromechanical coupling when vibrated in said shear mode of motion.

11. A quartz piezoelectric element having a substantially square major plane, the width or X' axis of said major plane being inclined to the Z axis at a positive angle of substantially 120 degrees, the length of Z' axis of said major plane being inclined to said Z axis at a positive angle of substantially 57 degrees, and the plane of said length axis and said Z axis being disposed with respect to a compression positive X axis at a positive angle of substantially 0 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

12. A quartz piezoelectric element having a substantially square major plane, the width or X' axis of said major plane being inclined to the Z axis at a positive angle of substantially 105 degrees, the length or Z' axis of said major plane being inclined to said Z axis at a positive angle of substantially 53 degrees, and the plane of said length axis and said Z axis being disposed with respect to a compression positive X axis at a positive angle of substantially 15 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

13. A quartz piezoelectric element having a substantially squar major plane, the width or X' axis of said major plane being inclined to the Z axis at a positive angle of substantially 75 degrees, the length or Z' axis of said major plane being inclined to said Z axis at a positive angle of substantially 52 degrees, and the plane of said length axis and said Z axis being disposed with respect to a compression positive X axis at a positive angle of substantially 45 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

14. A quartz piezoelectric element having a substantially square major plane, the width or X' axis of said major plane being inclined to the Z axis at a positive angle of substantially 55 degrees, the length or Z' axis of said major plane being inclined to said Z axis at a positive angle of substantially 60 degrees, and the plane of said length axis and said Z axis being disposed with respect to a compression positive X axis at a positive angle of substantially 60 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

15. A quartz piezoelectric element having a substantially square major plane, the width or X' axis of said major plane being inclined to the Z axis at a positive angle of substantially 120 degrees, the length or Z' axis of said major plane being inclined to said Z axis at a positive angle of substantially 48 degrees, and the plane of said length axis and said Z axis being disposed with respect to a compression positive X axis at a positive angle of substantially 60 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

16. A quartz piezoelectric element having a substantially square major plane, the width or X' axis of said major plane being inclined to the Z axis at a positive angle of substantially 105 degrees, the length or Z' axis of said major plane being inclined to said Z axis at a positive angle of substantially 40 degrees, and the plane of said length axis and said Z axis being disposed with respect to a compression positive X axis at a positive angle of substantially 75 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

17. A quartz piezoelectric element having a substantially square major plane, the width or X' axis of said major plane being inclined to the Z axis at a positive angle of substantially 75 degrees, the length or Z' axis of said major plane being inclined to said Z axis at a positive angle of substantially 40 degrees, and the plane of said length axis and said Z axis being disposed with respect to a compression positive X axis at a positive angle of substantially 105 degrees as measured in the plane of said X axis and a Y axis, to obtain a relatively small temperature coefficient of frequency and a relatively large electromechanical coupling when subjected to an electric field in the direction of the thickness axis dimension perpendicular to said major plane and vibrated in a shear mode of motion at a frequency which is determined substantially by said major plane dimensions.

WARREN P. MASON.